US012700303B2

(12) United States Patent
Cho

(10) Patent No.: US 12,700,303 B2
(45) Date of Patent: Aug. 4, 2026

(54) METHOD FOR CONTROLLING ILLEGAL PARKING BASED ON MOBILE ROBOT AND MOBILE ROBOT THEREFOR

(71) Applicant: HL Robotics Co., Ltd., Seongnam-si (KR)

(72) Inventor: Youngha Cho, Yongin-si (KR)

(73) Assignee: HL Robotics Co., Ltd., Seongnam-si (KR)

( * ) Notice: Subject to any disclaimer, the term of this patent is extended or adjusted under 35 U.S.C. 154(b) by 201 days.

(21) Appl. No.: 18/372,874

(22) Filed: Sep. 26, 2023

(65) Prior Publication Data

US 2024/0395135 A1 Nov. 28, 2024

(30) Foreign Application Priority Data

May 22, 2023 (KR) ........................ 10-2023-0065540

(51) Int. Cl.
| | |
|---|---|
| *G08G 1/017* | (2006.01) |
| *G06Q 50/18* | (2012.01) |
| *G06V 20/58* | (2022.01) |
| *G06V 20/62* | (2022.01) |
| *G08G 1/09* | (2006.01) |

(52) U.S. Cl.
CPC ......... *G08G 1/0175* (2013.01); *G06V 20/582* (2022.01); *G08G 1/017* (2013.01); *G08G 1/091* (2013.01); *G06Q 50/18* (2013.01); *G06V 20/625* (2022.01)

(58) Field of Classification Search
CPC ...... G08G 1/0175; G08G 1/017; G08G 1/091; G06V 20/582; G06V 20/625; G06Q 50/18
See application file for complete search history.

(56) References Cited

U.S. PATENT DOCUMENTS

| | | | | |
|---|---|---|---|---|
| 6,081,206 A | * | 6/2000 | Kielland | ........... G06Q 30/0284 |
| | | | | 194/902 |
| 7,711,150 B2 | * | 5/2010 | Simon | ..................... G08G 1/054 |
| | | | | 382/105 |
| 9,773,413 B1 | * | 9/2017 | Li | ........................... G08G 1/144 |

(Continued)

FOREIGN PATENT DOCUMENTS

| | | | | |
|---|---|---|---|---|
| CN | 106571039 A | * | 4/2017 | ........... G08G 1/0175 |
| CN | 109436353 A | * | 3/2019 | ............. B64D 47/02 |

(Continued)

OTHER PUBLICATIONS

Translation of CN-106571039-A, 18 pages (Year: 2017).*

(Continued)

*Primary Examiner* — Dale W Hilgendorf

(74) *Attorney, Agent, or Firm* — Hauptman Ham, LLP

(57) ABSTRACT

A method for controlling illegal parking based on a mobile robot is provided. The method for controlling illegal parking based on a mobile robot includes extracting a driving map corresponding to an area in which the mobile robot travels, determining whether at least part of the area is an illegal parking area based on sensing data obtained from the mobile robot, setting an illegal parking area in the extracted driving map in a case where it is determined that the at least part is an illegal parking area, and determining whether a vehicle is illegally parked using the driving map in which the illegal parking area has been set.

8 Claims, 7 Drawing Sheets

(56) References Cited

U.S. PATENT DOCUMENTS

| | | | | |
|---|---|---|---|---|
| 10,311,731 | B1 * | 6/2019 | Li | G08G 1/012 |
| 10,872,250 | B2 * | 12/2020 | Gibbs | G06V 20/584 |
| 11,164,457 | B2 * | 11/2021 | Niewiadomski | G08G 1/143 |
| 11,538,255 | B2 * | 12/2022 | Gibbs | G06V 20/584 |
| 2012/0215383 | A1 * | 8/2012 | Yoon | H04N 7/18 |
| | | | | 701/2 |
| 2015/0138001 | A1 * | 5/2015 | Davies | G08G 1/146 |
| | | | | 340/932.2 |
| 2016/0078299 | A1 * | 3/2016 | Nerayoff | G08G 1/0175 |
| | | | | 705/13 |
| 2018/0211117 | A1 * | 7/2018 | Ratti | G06F 15/76 |
| 2018/0336427 | A1 * | 11/2018 | Gibbs | G06V 20/584 |
| 2019/0043355 | A1 * | 2/2019 | Ferguson | G01C 21/3438 |
| 2020/0219390 | A1 * | 7/2020 | Lyles | G07B 15/02 |
| 2021/0264785 | A1 * | 8/2021 | Niewiadomski | G08G 1/168 |

FOREIGN PATENT DOCUMENTS

| | | | | | |
|---|---|---|---|---|---|
| KR | 20060025407 | A | * | 3/2006 | G06V 20/625 |
| KR | 20060099596 | A | * | 9/2006 | G08G 1/0175 |

OTHER PUBLICATIONS

Translation of CN-109436353-A, 7 pages (Year: 2019).*
Translation of KR-20060099596-A, 10 pages (Year: 2006).*
Translation of KR-20060025407-A, 13 pages (Year: 2006).*

* cited by examiner

100

(a)

(b)     310

410

412

600

METHOD FOR CONTROLLING ILLEGAL PARKING BASED ON MOBILE ROBOT AND MOBILE ROBOT THEREFOR

CROSS-REFERENCE TO RELATED APPLICATION

This application claims priority under 35 U.S.C. § 119 to Korean Patent Application No. 10-2023-0065540, filed on May 22, 2023, in the Korean Intellectual Property Office (KIPO), the disclosure of which is incorporated by reference herein in its entirety.

TECHNICAL FIELD

The present disclosure relates to a method for controlling illegal parking based on a mobile robot and a mobile robot therefor, and more specifically, to a method for controlling illegal parking based on a mobile robot in which an illegal parking area is set on a driving map and the mobile robot controls vehicles present in the illegal parking area, and a mobile robot therefor.

BACKGROUND

Recently, technologies for controlling illegal parking have continuously been developed. For example, technologies for controlling illegal parking using a plurality of camera sensors such as CCTVs or detecting illegal parking using sensors installed in parking areas are being developed.

However, such conventional technologies can only control illegal parking in a specific space, and require installation of a separate camera sensor or the like in each space and thus system costs increase. To solve such problems, a mobile enforcement system is being developed, but even in this case, it is only possible to determine illegal parking after capturing an image of an arbitrary vehicle parked, and thus it is difficult to take measures against illegal parking in real time.

SUMMARY

The present disclosure provides a method for controlling illegal parking based on a mobile robot and a mobile robot to solve the above problems.

The present disclosure can be implemented in a variety of ways, including a method, an apparatus (system) or a non-transitory computer-readable medium storing a computer program.

According to an embodiment of the present disclosure, a method for controlling illegal parking based on a mobile robot performed by at least one processor includes extracting a driving map corresponding to an area in which the mobile robot travels, determining whether at least part of the area is an illegal parking area based on sensing data obtained from the mobile robot, setting an illegal parking area in the extracted driving map in a case where it is determined that the at least part is an illegal parking area, and determining whether a vehicle is illegally parked using the driving map in which the illegal parking area has been set.

According to an embodiment of the present disclosure, the extracting of the driving map corresponding to the area in which the mobile robot travels may include extracting a location of the mobile robot, and extracting a driving map corresponding to an area within a predetermined distance from the location of the mobile robot.

According to an embodiment of the present disclosure, the determining of whether at least part of the area is an illegal parking area may include identifying at least one sign in the area in which the mobile robot travels using at least one sensor, determining whether the identified sign is associated with an illegal parking area, and determining at least part of the area as an illegal parking area based on the at least one sign in a case where it is determined that the at least one sign is associated with an illegal parking area.

According to an embodiment of the present disclosure, the at least one sign may include a first sign and a second sign. The determining of at least part of the area as an illegal parking area based on the at least one sign includes determining a section between a location of the first sign and a location of the second sign as an illegal parking area.

According to an embodiment of the present disclosure, the determining of whether the identified sign is associated with an illegal parking area may include determining whether the at least one sign is associated with an illegal parking area by providing an image associated with the at least one sign to a first trained artificial neural network model.

According to an embodiment of the present disclosure, the determining of whether a vehicle is illegally parked using the driving map in which the illegal parking area has been set may include recognizing whether or not the vehicle is included in the illegal parking area by a predetermined threshold value or more, and determining that the vehicle is illegally parked in a case where the vehicle is included by the predetermined threshold value or more.

According to an embodiment of the present disclosure, the method may further include recognizing a license plate number of the vehicle in a case where it is determined that the vehicle is illegally parked, and transmitting an illegal parking report using the recognized license plate number.

According to an embodiment of the present disclosure, the recognizing of the license plate number of the vehicle may include recognizing the license plate number by providing an image associated with the license plate of the vehicle to a second trained artificial neural network model.

According to an embodiment of the present disclosure, the recognizing of the license plate number of the vehicle may include recognizing the license plate number at a first time, and re-recognizing the license plate number at a second time after the first time. The transmitting of the illegal parking report using the recognized license plate number may include transmitting the illegal parking report in a case where the license plate number is recognized at the first time and the second time.

According to an embodiment of the present disclosure, the method may further include transmitting an illegal parking warning broadcast between the first time and the second time in a case where the license plate number is recognized at the first time.

A mobile robot according to an embodiment of the present disclosure includes at least one sensor configured to acquire sensing data related to a situation around the mobile robot, a controller configured to determine whether a vehicle is illegally parked using sensing data obtained from the at least one sensor, and a driver configured to drive the mobile robot based on a command of the controller.

According to an embodiment of the present disclosure, the controller may be configured to extract a driving map corresponding to an area in which the mobile robot travels, determine whether at least part of the area is an illegal parking area based on sensing data obtained from the mobile robot, and set an illegal parking area in the extracted driving map in a case where it is determined that the at least part is an illegal parking area.

According to an embodiment of the present disclosure, the controller may be configured to identify at least one sign in the area in which the mobile robot travels using the at least one sensor, determine whether the identified sign is associated with an illegal parking area, and determine at least part of the area as an illegal parking area based on the at least one sign in a case where it is determined that the at least one sign is associated with an illegal parking area.

According to an embodiment of the present disclosure, the at least one sign may include a first sign and a second sign. The controller may be configured to determine a section between a location of the first sign and a location of the second sign as an illegal parking area.

According to an embodiment of the present disclosure, the controller may be configured to determine whether the at least one sign is associated with an illegal parking area by providing an image associated with the at least one sign to a first trained artificial neural network model.

According to an embodiment of the present disclosure, the controller may be configured to recognize whether or not the vehicle is included in the illegal parking area by a predetermined threshold value or more, and determine that the vehicle is illegally parked in a case where the vehicle is included by the predetermined threshold value or more.

According to an embodiment of the present disclosure, the controller may be configured to recognize a license plate number of the vehicle in a case where it is determined that the vehicle is illegally parked, and transmit an illegal parking report using the recognized license plate number.

According to an embodiment of the present disclosure, the controller may be configured to recognize the license plate number by providing an image associated with the license plate of the vehicle to a second trained artificial neural network model.

According to an embodiment of the present disclosure, the controller may be configured to recognize the license plate number at a first time, re-recognize the license plate number at a second time after the first time, and transmit the illegal parking report in a case where the license plate number is recognized at the first time and the second time.

According to an embodiment of the present disclosure, the controller may be configured to transmit an illegal parking warning broadcast between the first time and the second time in a case where the license plate number is recognized at the first time.

In various embodiments of the present disclosure, the mobile robot can autonomously travel, determine an illegal parking area in real time, and effectively take automatic measures such as reporting a vehicle parked in an illegal parking area.

In various embodiments of the present disclosure, the mobile robot can simply identify an illegal parking area based on content indicated on a sign.

In various embodiments of the present disclosure, in a case where an illegal parking area is set in a driving map and used, the mobile robot can simply recognize entering the illegal parking area, and based on this, intensive illegal parking enforcement can be performed.

The effects of the present disclosure are not limited to the effects mentioned above, and other effects not mentioned will be clearly understood by those of ordinary skill in the art (referred to as "ordinary technicians") from the description of the claims.

BRIEF DESCRIPTION OF THE DRAWINGS

Embodiments of the present disclosure will be described with reference to the accompanying drawings in which like reference numerals indicate like elements, but are not limited thereto.

DETAILED DESCRIPTION

Figure 1:
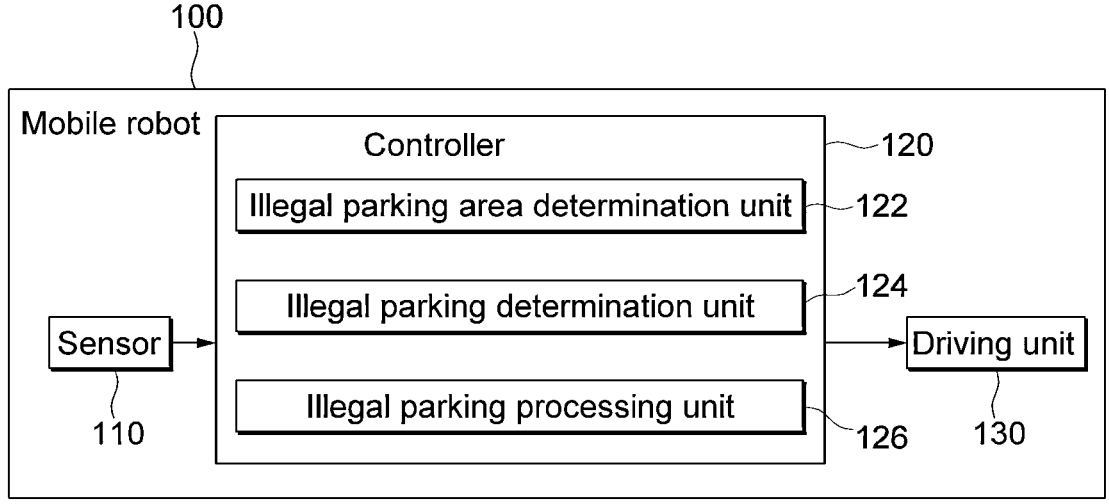
FIG. 1 is a functional block diagram showing an internal configuration of a mobile robot according to an embodiment of the present disclosure.

Hereinafter, specific details for implementation of the present disclosure will be described with reference to the accompanying drawings. However, in the following description, if detailed description of known functions or configurations would unnecessarily obscure the gist of the present disclosure, detailed description thereof will be omitted.

In the accompanying drawings, identical or corresponding elements are given the same reference numerals. In addition, in the description of the following embodiments, redundant descriptions of the same or corresponding components may be omitted. However, omission of a description of a component does not intend that such a component is not included in an embodiment.

Advantages and features of the disclosed embodiments, and methods of achieving the same will become apparent with reference to the following embodiments in conjunction with the accompanying drawings. However, the present disclosure is not limited to the embodiments disclosed below and may be implemented in various different forms, and the embodiments are provided only to complete the present disclosure and to fully inform those skilled in the art of the scope of the present disclosure.

Terms used in this specification will be briefly described, and the disclosed embodiments will be described in detail. The terms used in this specification have been selected from general terms that are currently widely used as much as possible in consideration of the functions in the present disclosure, but these may vary depending on the intention or precedent of a person skilled in the art, the emergence of new technologies, and the like. In addition, in a specific case, there is also a term arbitrarily selected by the applicant, and in this case, the meaning will be described in detail in the description of the present disclosure. Therefore, the term used in the present disclosure should be defined based on the meanings of the terms and the overall content of the present disclosure, not simply the names of the terms.

In the present disclosure, singular representation is intended to include plural representation as well, unless the context clearly indicates otherwise. Also, plural representation includes singular representation, unless the context clearly specifies plural. When it is said that a certain part includes a certain component in the specification, this means that it may further include other components without excluding other components unless otherwise stated.

In the present disclosure, the terms "comprise," "comprising" and the like may indicate that features, steps, operations, elements and/or components are present, but do not exclude addition of one or more other functions, steps, operations, elements, components, and/or combinations thereof.

In the present disclosure, when a specific element is described as being "coupled," "combined," "connected," or "reactive" to any other element, the specific element may be directly coupled to, combined with and/or connected to or reactive to the other element, but is not limited thereto. For example, one or more intermediate elements may be present between a specific element and another element. Further, in the present disclosure, "and/or" may include each of one or more items listed or a combination of at least a part of one or more items.

In the present disclosure, terms such as "first" and "second" are used to distinguish a specific element from other elements, and the aforementioned elements are not limited by these terms. For example, the "first" element may have the same or similar form as the "second" element.

In the present disclosure, a "sign" may refer to a visual medium for notifying drivers or pedestrians of caution or warning. In addition, "signs related to illegal parking" are signs indicating areas where parking is prohibited by law, and may include, for example, school zone signs, elderly protection zone signs, disabled protection zone signs, parking prohibition signs, and the like, but are not limited thereto.

FIG. 1 is a functional block diagram showing an internal configuration of a mobile robot 100 according to an embodiment of the present disclosure. As shown, the mobile robot 100 refers to an autonomous robot that patrols a certain section based on a driving map, and includes at least one sensor 110 for acquiring sensing data related to a situation around the mobile robot 100, a controller 120, and a driving unit 130 for driving the mobile robot 100 based on a command from the controller 120, but is not limited thereto. In addition, the controller 120 is illustrated as including an illegal parking area determination unit 122, an illegal parking determination unit 124, an illegal parking processing unit 126, and the like, but is not limited thereto.

According to an embodiment, the mobile robot 100 may detect the surrounding environment of the mobile robot 100 using various sensors 110. For example, the mobile robot 100 may include a camera sensor, a lidar sensor, a radar sensor, and the like as sensors for detecting a surrounding object such as a vehicle or identifying a sign, but is not limited thereto. For example, the mobile robot 100 may further include a global navigation satellite system (GNSS) sensor for detecting the location of the mobile robot 100.

According to an embodiment, the mobile robot 100 may determine whether a vehicle is illegally parked using sensing data obtained from the sensor 110. To this end, the mobile robot 100 may extract a driving map corresponding to a driving area in which the mobile robot 100 travels and determine whether at least a part of the driving area is an illegal parking area based on sensing data obtained from the mobile robot 100. Then, upon determining that the corresponding area is an illegal parking area, the mobile robot 100 may set the illegal parking area on the extracted driving map and determine illegal parking of a vehicle using the driving map in which the illegal parking area is set.

According to an embodiment, the controller 120 may extract the location of the mobile robot 100 using a GNSS sensor or the like and extract a driving map corresponding to an area within a predetermined distance from the location of the mobile robot 100. Then, the illegal parking area determination unit 122 of the controller 120 may determine at least a part of the driving area in which the mobile robot 100 travels as an illegal parking area.

According to an embodiment, the illegal parking area determination unit 122 may identify at least one sign on the area in which the mobile robot 100 travels using at least one sensor 110 and determine whether the identified sign is associated with an illegal parking area. Here, the illegal parking area determination unit 122 may provide images associated with at least one sign to a trained artificial neural network model to determine whether the sign is associated with the illegal parking area, but is not limited thereto. Upon determining that the at least one sign is a sign associated with the illegal parking area, the illegal parking area determining unit 122 may determine at least a part of the driving area as an illegal parking area based on the at least one sign.

According to an embodiment, the illegal parking area determining unit 122 may identify a first sign and a second sign associated with an illegal parking area and set a section between the location of the first sign and the location of the second sign as an illegal parking area. For example, the illegal parking area determination unit 122 may determine a section between a first sign indicating that a school zone starts and a second sign indicating that the school zone ends as an illegal parking area.

Upon determining an illegal parking area in this manner, the illegal parking area determining unit 122 may set the illegal parking area on the extracted driving map. In a case where the mobile robot 100 travels using the driving map on which the illegal parking area has been set, the mobile robot 100 can simply recognize whether or not a vehicle is present in the set illegal parking area.

According to an embodiment, the illegal parking determination unit 124 of the controller 120 may determine whether or not a vehicle is illegally parked based on whether or not the vehicle is present in the determined illegal parking area. For example, the illegal parking determining unit 124 may recognize whether or not a vehicle is included in the illegal parking area by a predetermined threshold value (e.g., 50%) or more, and if the vehicle is included by the predetermined threshold value or more, determine that the vehicle is illegally parked. For example, in a case where the vehicle is parked at a point where the illegal parking area starts or ends, the mobile robot 100 may determine whether the vehicle is illegally parked or not based on the ratio of the portion of the vehicle included in the illegal parking area.

According to an embodiment, the illegal parking processing unit 126 of the controller 120 may recognize the license plate number of a vehicle if it is determined that the vehicle is illegally parked. For example, the illegal parking processing unit 126 may recognize or extract the license plate number by providing an image associated with the license plate of the vehicle to a trained artificial neural network model. Then, the illegal parking processing unit 126 may transmit an illegal parking report using the recognized license plate number. For example, the illegal parking report is transmitted to a related local government and/or control center and may include the parked location of the vehicle, the license plate number, and/or a vehicle image.

According to an embodiment, the illegal parking processing unit 126 may recognize a license plate number at a first time and re-recognize a license plate number at a second time after the first time. Then, the illegal parking processing unit 126 may transmit an illegal parking report in a case where the same license plate number is recognized at the first time and the second time. That is, the illegal parking processing unit 126 may recognize license plate numbers twice or more in order to confirm that a vehicle is parked in the illegal parking area continuously for a certain period of time and send an illegal parking report in a case where the same license plate number is repeatedly recognized.

Additionally or alternatively, the illegal parking processing unit 126 may transmit an illegal parking warning broadcast between the first time and the second time in a case where a license plate number is recognized at the first time. For example, the illegal parking processing unit 126 may transmit a warning such as "Please move the vehicle 12-ga 3456." Through a transmission device of the mobile robot 100 to perform illegal parking warning broadcast.

Although respective functional components included in the mobile robot 100 are separately illustrated in FIG. 1, this is only to aid in understanding of the present disclosure, and one arithmetic device may execute two or more functions. With this configuration, the mobile robot 100 can determine illegal parking areas in real time while autonomously traveling, and can effectively take automatic measures such as reporting vehicles parked in illegal parking areas.

Figure 2:
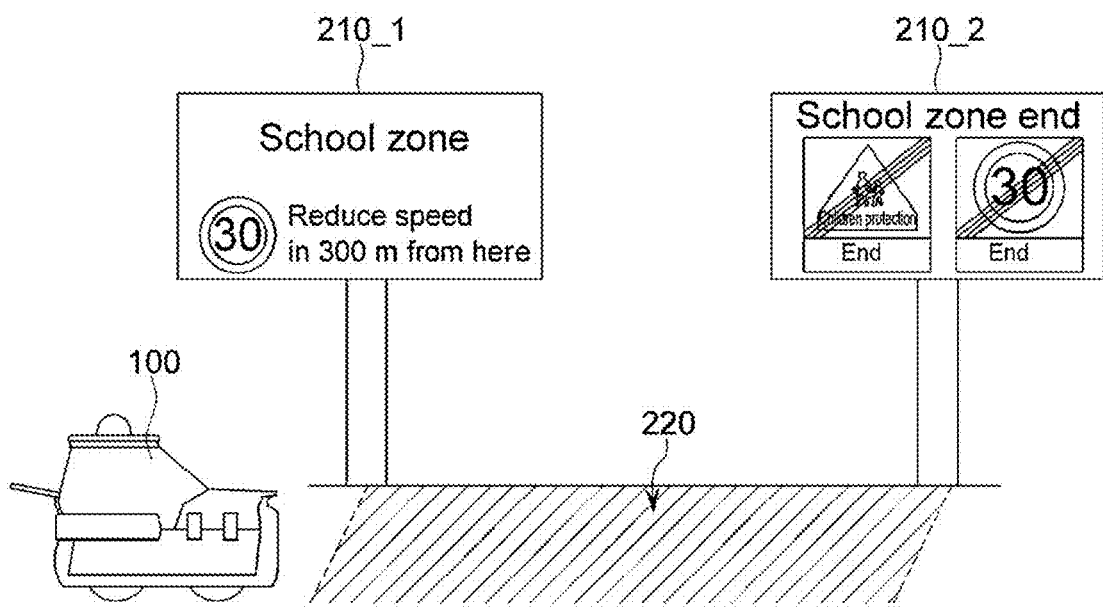
FIG. 2 is a diagram showing an example of determining an illegal parking area by the mobile robot according to an embodiment of the present disclosure.

FIG. 2 is a diagram showing an example of determining an illegal parking area 220 by the mobile robot 100 according to an embodiment of the present disclosure. According to an embodiment, the mobile robot 100 may autonomously travel to capture a front view image with a camera or the like and extract a street sign image from the front view image using an object recognition algorithm or the like. Then, the mobile robot 100 may recognize characters included in the extracted street sign image to determine whether the corresponding street sign 210 is a street sign for a school zone, an elderly protection zone, or a disabled protection zone associated with an illegal parking area. In a case where it is determined that the recognized street sign 210 is a street sign associated with an illegal parking area, the mobile robot 100 may determine at least a part of the area in which the mobile robot 100 is traveling as the illegal parking area 220 based on the street sign 210.

As shown, the street sign 210 may include a first street sign 210_1 for indicating the start of a school zone and a second street sign 210_2 for indicating the end of the school zone. In this case, the mobile robot 100 may set the range of the school zone, which is an illegal parking area, using the first street sign 210_1 and the second street sign 210_2. For example, the mobile robot 100 may determine a section between the position of the first street sign 210_1 and the position of the second street sign 210_2 as the illegal parking area 220.

Although FIG. 2 illustrates that the section between the first street sign 210_1 and the second street sign 210_2 is the illegal parking area 220, the present disclosure is not limited thereto and a range extended by a specific size in the section between the position of the first street sign 210_1 and the position of the second street sign 210_2 may be determined as an illegal parking area. In addition, although FIG. 2 illustrates that the illegal parking area is determined using only street signs, the present disclosure is not limited thereto, and the illegal parking area may be determined additionally using the color of the ground, text displayed on the ground, and the like. With this configuration, the mobile robot 100 can simply identify the illegal parking area 220 based on the content indicated on street signs.

Figure 3:
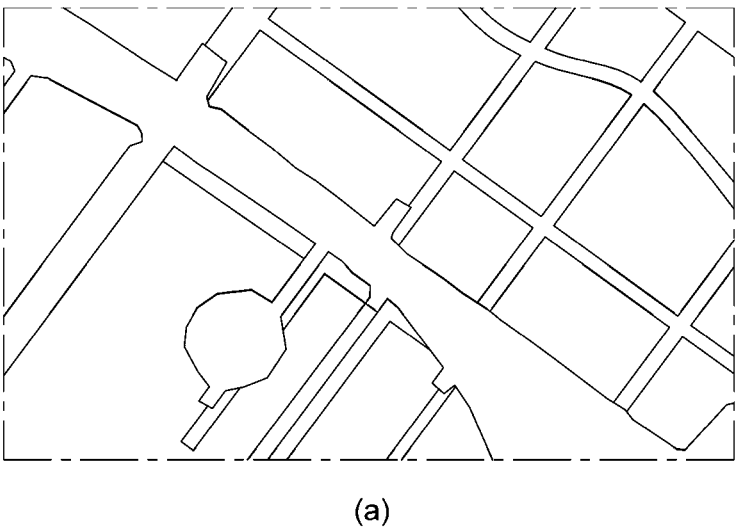
FIG. 3 is a diagram showing an example of a driving map associated with the mobile robot according to an embodiment of the present disclosure.
Figure 3:
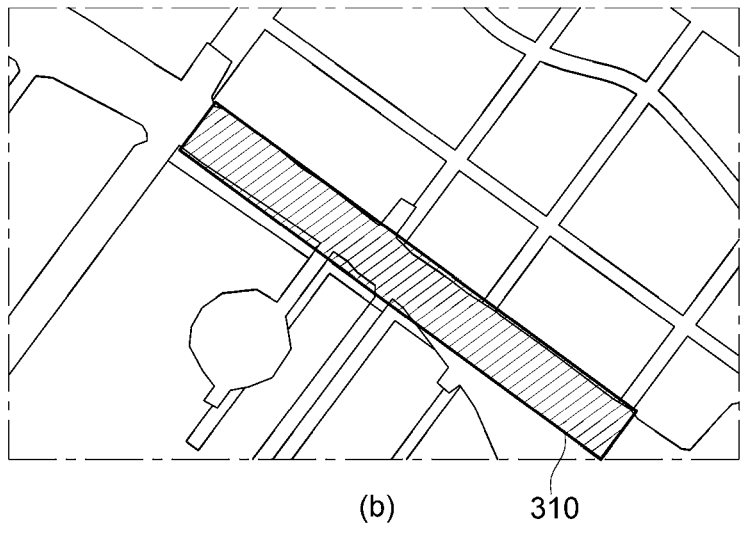

FIG. 3 is a diagram showing an example of a driving map associated with a mobile robot according to an embodiment of the present disclosure. As described above, the mobile robot may autonomously travel in a specific area based on a driving map and control illegal parking. For example, as shown in the image (a), a driving map corresponding to an area within a predetermined distance from the location of the mobile robot may be extracted, and the mobile robot may autonomously travel based on the driving map.

According to an embodiment, the mobile robot may determine whether at least a part of the area is an illegal parking area based on sensing data, and if it is determined that the part is an illegal parking area, set an illegal parking area 310 on the extracted driving map. For example, as shown in the image (b), a partial area on the driving map may be set as the illegal parking area 310.

That is, the mobile robot may autonomously travel based on the driving map to recognize a street sign on a road and determine whether the street sign is associated with an illegal parking area based on the type and content of the street sign. Then, after checking the start section and end section of the illegal parking area, the mobile robot may determine the area from the start section to the end section as an illegal parking area. In this way, in a case where an illegal parking area is determined, the mobile robot may perform section setting by uploading the illegal parking area on the driving map.

With this configuration, in a case where an illegal parking area is set on a driving map and used, the mobile robot can simply recognize entering the illegal parking area, and based on this, intensive illegal parking enforcement can be performed.

Figure 4:
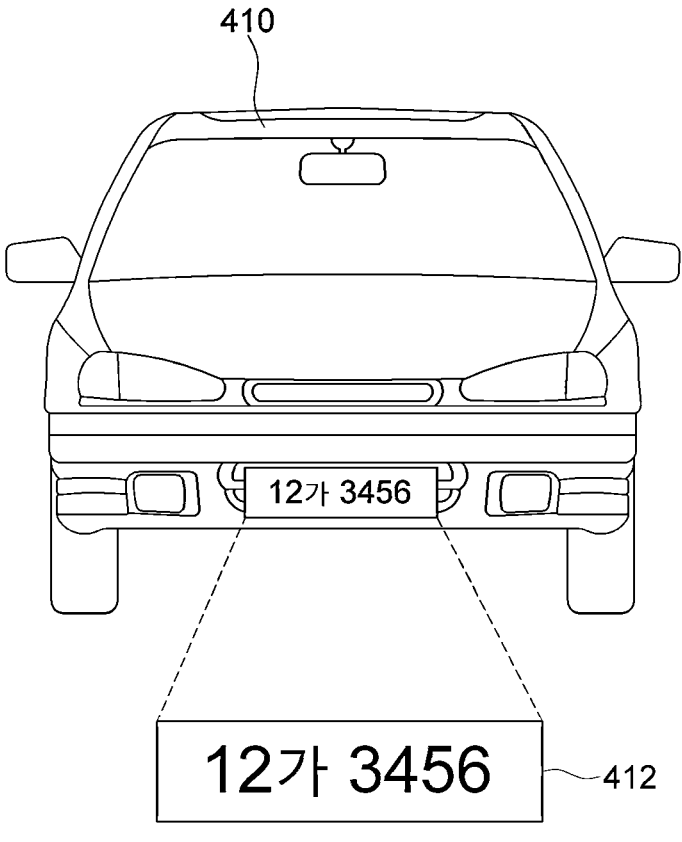
FIG. 4 is a diagram showing an example of identifying a license plate number in an illegal parking area according to an embodiment of the present disclosure.

FIG. 4 is a diagram showing an example of identifying a license plate number in an illegal parking area according to an embodiment of the present disclosure. According to an embodiment, the mobile robot may recognize the license plate number of a vehicle upon determining that the vehicle is illegally parked, and transmit an illegal parking report using the recognized license plate number.

As shown, the mobile robot may acquire a vehicle image by capturing an image of a vehicle 410 parked in an illegal parking area and may determine a license plate area 412 from the acquired vehicle image. For example, the mobile robot may determine the area 412 corresponding to the license plate included in the vehicle image, extract coordinate values representing the location of the area 412, and perform data preprocessing thereon. That is, the mobile robot may detect and label the region corresponding to the license plate in the vehicle image using an arbitrary object detection algorithm and/or a machine learning model.

Then, the mobile robot may recognize the license plate number of the vehicle 410 by recognizing the characters of the determined license plate area 412. For example, the mobile robot may recognize the license plate number by providing an image associated with the license plate of the vehicle to a trained artificial neural network model for character recognition, but the present disclosure is not limited thereto.

According to an embodiment, the mobile robot may repeatedly recognize the license plate number for a specific period of time. For example, the mobile robot may recognize the license plate number at a first time. In this case, the mobile robot may transmit an illegal parking warning broadcast based on the recognized license plate number. Then, the mobile robot may re-recognize the license plate number at a second time after the first time. In this manner, the mobile robot may transmit an illegal parking report using the recognized license plate number in a case where the license plate number is re-recognized even after warning broadcast.

Figure 5:
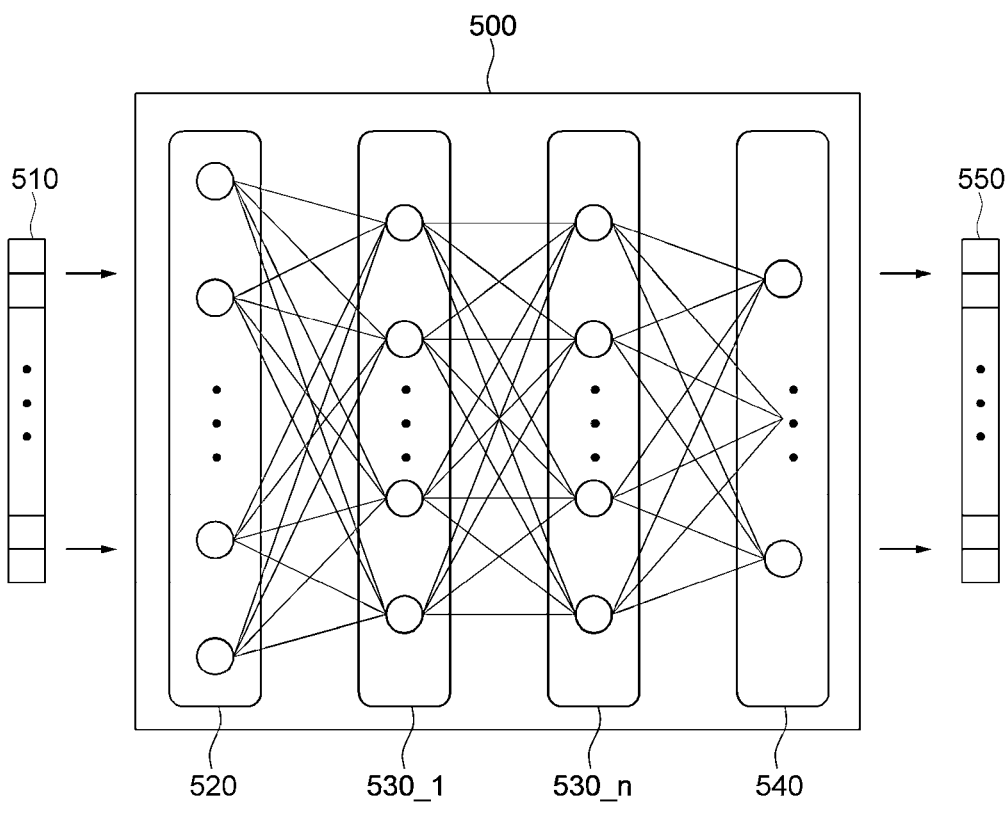
FIG. 5 is an exemplary diagram showing an artificial neural network model according to an embodiment of the present disclosure.

FIG. 5 is an exemplary diagram showing an artificial neural network model 500 according to an embodiment of the present disclosure. The artificial neural network model 500, as an example of a machine learning model, is a statistical learning algorithm realized based on the structure of a biological neural network or a structure for executing the algorithm in machine learning technology and cognitive science.

According to one embodiment, the artificial neural network model 500 may be a machine learning model having problem-solving ability in which nodes that are artificial neurons forming a network by synaptic coupling as in a biological neural network repeatedly adjust synaptic weights to perform learning such that error between correct output and inferred output response to specific input is reduced. For example, the artificial neural network model 500 may include an arbitrary probability model, a neural network model, and the like used in artificial intelligence learning methods such as machine learning and deep learning.

The artificial neural network model 500 may be implemented as a multilayer perceptron (MLP) composed of multilayer nodes and connections therebetween. The artificial neural network model 500 according to the present embodiment may be implemented using one of various artificial neural network model structures including the MLP, but is not limited thereto. As shown in FIG. 5, the artificial neural network model 500 includes an input layer 520 that receives an input signal or data 510 from the outside, an output layer 540 that outputs an output signal or data 550 corresponding to the input data, and n (n being a positive integer) hidden layers 530-1 to 530-$n$ that is located between the input layer 520 and the output layer 540, receives a signal from the input layer 520, extracts characteristics, and transfers the characteristics to the output layer 540. Here, the output layer 540 receives signals from the hidden layers 530_1 to 530_$n$ and outputs the same to the outside.

The learning method of the artificial neural network model 500 includes a supervised learning method that performs learning to be optimized for problem solving according to input of a teacher signal (correct answer), and an unsupervised learning method that does not require a teacher signal. According to an embodiment, input variables of the artificial neural network model 500 may include an image frame, a feature value extracted from each image, and the like.

In this manner, a plurality of output variables corresponding to a plurality of input variables is matched with the input layer 520 and the output layer 540 of the artificial neural network model 500, and synaptic values between nodes included in the input layer 520, the hidden layers 530_1 to 530_$n$, and the output layer 540 are adjusted to perform learning such that a correct output corresponding to a specific input can be extracted. Through this learning process, it is possible to ascertain characteristics hidden in the input variables of the artificial neural network model 500 and to adjust synaptic values (or weights) between nodes of the artificial neural network model 500 such that error between output variables calculated based on the input variables and a target output is reduced.

According to an embodiment, a first artificial neural network model may receive an image associated with at least one sign and determine whether the sign is associated with an illegal parking area. In addition, a second artificial neural network model may receive an image associated with a license plate of a vehicle and recognize a license plate number of an illegally parked vehicle. Here, the first artificial neural network model and/or the second artificial neural network model are object detection models, and may be models based on You Only Look Once (YOLO), but are not limited thereto.

Figure 6:
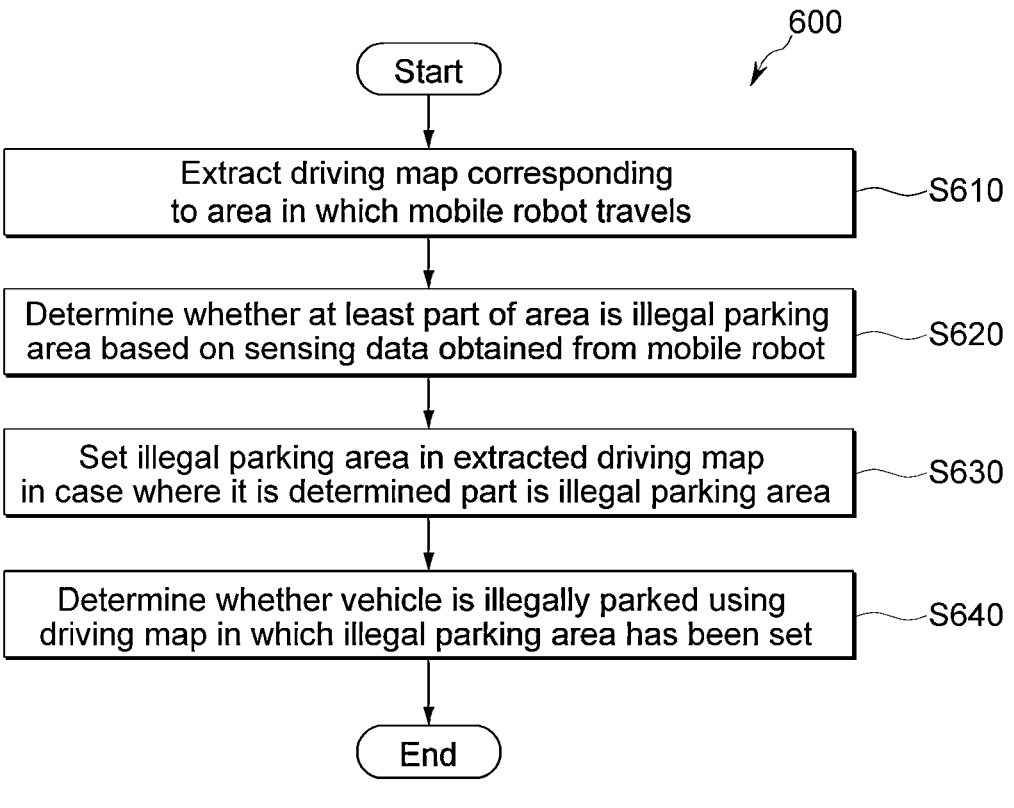
FIG. 6 is a flowchart showing an example of a method for determining illegal parking according to an embodiment of the present disclosure.

FIG. 6 is a flowchart illustrating an example of an illegal parking determination method 600 according to an embodiment of the present disclosure. The illegal parking determination method 600 may be performed by at least one processor (e.g., at least one processor of a mobile robot). The illegal parking determination method 600 may be started by the processor extracting a driving map corresponding to an area in which the mobile robot travels (S610). For example, the processor may extract the location of the mobile robot and extract a driving map corresponding to an area within a predetermined distance from the location of the mobile robot.

The processor may determine whether at least part of the area is an illegal parking area based on sensing data obtained from the mobile robot (S620). In addition, if it is determined that the part is an illegal parking area, the processor may set the illegal parking area on the extracted driving map (S630). For example, the processor may identify at least one sign in the area in which the mobile robot travels using at least one sensor. Subsequently, the processor may determine whether the identified sign is associated with an illegal parking area, and if it is determined that the at least one sign is associated with an illegal parking area, determine at least part of the area as an illegal parking area based on the at least one sign. Here, the processor may provide an image associated with the at least one sign to a first trained artificial neural network model to determine whether the sign is associated with an illegal parking area.

The processor may determine whether a vehicle is illegally parked using the driving map in which the illegal parking area is set (S640). For example, the processor may recognize whether the vehicle is included in the illegal parking area by a predetermined threshold value or more and may determine that the vehicle is illegally parked if the vehicle is included in the illegal parking area by the predetermined threshold value or more.

Figure 7:
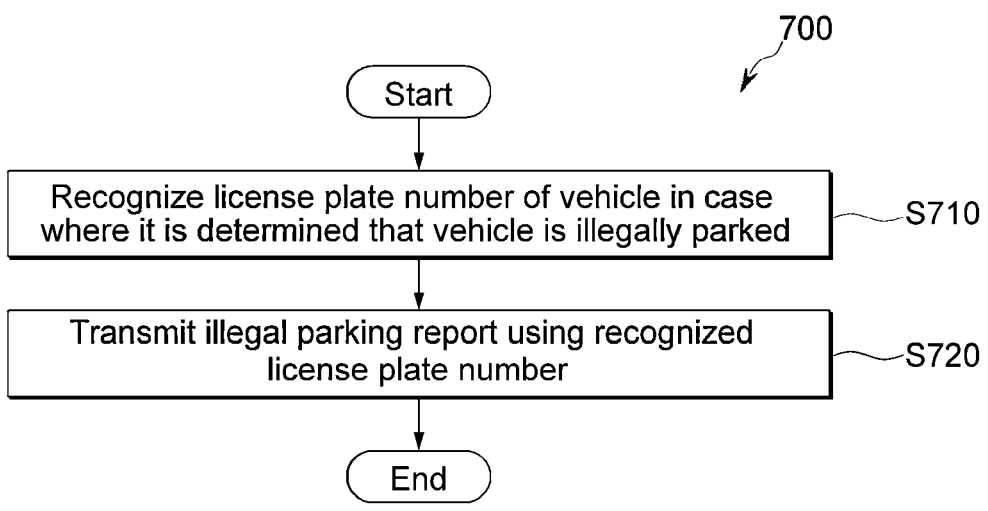
FIG. 7 is a flowchart showing an example of a method for controlling illegal parking according to an embodiment of the present disclosure.

FIG. 7 is a flowchart showing an example of an illegal parking control method 700 according to an embodiment of the present disclosure. The illegal parking control method 700 may be performed by at least one processor (e.g., at least one processor of a mobile robot). The illegal parking control method 700 may be started by the processor recognizing the license plate number of a vehicle in a case where it is determined that the vehicle is illegally parked (S710). For example, the processor may recognize the license plate number by providing an image associated with the license plate of the vehicle to a second trained artificial neural network model.

The processor may transmit an illegal parking report using the recognized license plate number (S720). For example, an illegal parking report is transmitted to a related local government and/or control center, and may include a position at which a vehicle is parked, a license plate number, and a vehicle image. Additionally or alternatively, the processor may recognize the license plate number at a first time, and re-recognize the license plate number at a second time after the first time. Then, the processor may transmit an illegal parking report when the license plate number is recognized at the first time and the second time. Additionally or alternatively, the processor may transmit an illegal parking warning broadcast between the first time and the second time when the license plate number is recognized at the first time.

The above-described methods and/or various embodiments may be realized with digital electronic circuits, computer hardware, firmware, software, and/or combinations thereof. Various embodiments of the present disclosure may be implemented by a data processing device, for example, one or more programmable processors and/or one or more computing devices, or implemented as a computer-readable recording medium and/or a computer program stored in a computer-readable recording medium. The above-described computer program may be created in any form of programming language, including compiled or interpreted languages, and may be distributed in any form, such as a stand-alone program, module, or subroutine. The computer program may be distributed over one computing device, multiple computing devices connected through the same network, and/or multiple computing devices connected through multiple different networks.

The methods and/or various embodiments described above may be performed by one or more processors configured to execute one or more computer programs that process, store, and/or manage any function, function, or the like by operating based on input data or generating output data. For example, the methods and/or various embodiments of the present disclosure may be performed by a special purpose logic circuit such as a field programmable gate array (FPGA) or an application specific integrated circuit (ASIC), and a device and/or a system for performing the methods and/or embodiments of the present disclosure may be realized as a special purpose logic circuit such as an FPGA or an ASIC.

One or more processors executing a computer program may include a general purpose or special purpose microprocessor and/or one or more processors of any kind of digital computing device. A processor may receive instructions and/or data from each of a read-only memory and a random access memory, or receive instructions and/or data from the read-only memory and the random access memory. In the present disclosure, components of a computing device performing the methods and/or embodiments may include one or more processors for executing instructions, and one or more memory devices for storing instructions and/or data.

According to one embodiment, a computing device may exchange data with one or more large-capacity storage devices for storing data. For example, the computing device may receive data from a magnetic disc or an optical disc and transmit data to the magnetic disc or the optical disc. Computer-readable storage media suitable for storing instructions and/or data associated with a computer program may include any type of nonvolatile memory including a semiconductor memory device such as an erasable programmable read-only memory (EPROM), an electrically erasable PROM (EEPROM), or a flash memory device, but is not limited thereto. For example, computer readable storage media may include magnetic disks such as internal hard disks or removable disks, magneto-optical disks, CD-ROMs and DVD-ROM disks.

To provide interaction with a user, a computing device may include a display device (e.g., a cathode ray tube (CRT), a liquid crystal display (LCD), or the like) for providing or displaying information to users and a pointing device (e.g., a keyboard, a mouse, a trackball, or the like) through which a user can provide input and/or instructions to the computing device, but is not limited thereto. That is, the computing device may further include any other type of device for providing interaction with a user. For example, the computing device may provide any form of sensory feedback including visual feedback, auditory feedback, and/or tactile feedback to a user for interaction with the user. In this regard, the user may provide visual, audio, and motion input to the computing device through various gestures.

In the present disclosure, various embodiments may be implemented in a computing system including a back-end component (e.g., a data server), a middleware component (e.g., an application server), and/or a front-end component. In this case, the components may be interconnected by any form or medium of digital data communication, such as a communication network. For example, the communication network may include a local area network (LAN), a wide area network (WAN), and the like.

A computing device based on the exemplary embodiments described herein may be implemented using hardware and/or software configured to interact with a user, including a user device, a user interface (UI) device, a user terminal, or a client device. For example, the computing device may include a portable computing device such as a laptop computer. Additionally or alternatively, the computing device may include personal digital assistants (PDAs), tablet PCs, game consoles, wearable devices, Internet of things (IoT) devices, virtual reality (VR) devices, augmented reality (AR) device, and the like, but is not limited thereto. The computing device may further include other types of devices configured to interact with a user. Further, the computing device may include portable communication devices (e.g., a mobile phone, a smart phone, a wireless cellular phone, and the like) suitable for wireless communication over a network, such as a mobile communication network. The computing device may be configured to wirelessly communicate with a network server using wireless communication technologies and/or protocols such as radio frequency (RF), microwave frequency (MWF) and/or infrared ray frequency (IRF).

The various embodiments including specific structural and functional details in the present disclosure are exemplary. Accordingly, embodiments of the present disclosure are not limited to those described above and may be implemented in various other forms. In addition, the terms used in the present disclosure are for describing some embodiments and are not construed as limiting the embodiments. For example, the singular and the above may be construed to include plural as well, unless the context clearly dictates otherwise.

In the present disclosure, unless defined otherwise, all terms used in this specification, including technical or scientific terms, have the same meaning as commonly understood by a person of ordinary skill in the art to which such concept belongs. In addition, terms commonly used, such as terms defined in a dictionary, should be interpreted as having a meaning consistent with the meaning in the context of the related technology.

Although the present disclosure has been described in relation to some embodiments in this specification, various modifications and changes can be made without departing from the scope of the present disclosure that can be understood by those skilled in the art. Moreover, such modifications and variations are intended to fall within the scope of the claims appended hereto.

What is claimed is:

1. A method for controlling illegal parking based on a mobile robot performed by at least one processor, the mobile robot including a memory, a first sensor and a second sensor, the method comprising:

receiving, by the processor, a location of the mobile robot from the first sensor, and extracting a driving map corresponding to an area within a predetermined distance from the location of the mobile robot and storing the driving map in the memory, the first sensor being a location sensor;

receiving, by the processor, a first image of a first street sign from the second sensor, the second sensor being a camera;

providing, by the processor, the first image to a first trained artificial neural network model stored in the memory to determine whether the first street sign corresponds to a starting point of an illegal parking area;

receiving, by the processor, a second image of a second street sign from the second sensor;

providing, by the processor, the second image to the first trained artificial neural network model to determine whether the second street sign corresponds to an end point of the illegal parking area;

setting, by the processor, the illegal parking area in the extracted driving map and storing the illegal parking area in the memory, the illegal parking area being set as a road between locations of the first street sign and the second street sign;

controlling, by the processor, the mobile robot to move in the extracted driving map including the illegal parking area;

capturing, by the second sensor, a first license plate of a vehicle located within the illegal parking area at a first time;

capturing, by the second sensor, a second license plate of a vehicle located within the illegal parking area at a second time after the first time;

determining, by the processor, that license plate numbers of the first license plate and the second license plate are the same; and in response to determining that the license plate numbers are the same, transmitting, by the processor, an illegal parking report using the license plate numbers.

2. The method of claim 1, further comprising:

recognizing, by the processor, whether the vehicle is included in the illegal parking area by a predetermined threshold value or more; and determining, by the processor, that the vehicle is illegally parked in a case where the vehicle is included by the predetermined threshold value or more.

3. The method of claim 1, wherein the determining that license plate numbers are the same, comprises recognizing the license plate numbers by providing images associated with the first license plate and the second license plate to a second trained artificial neural network model.

4. The method of claim 1, further comprising transmitting an illegal parking warning broadcast between the first time and the second time.

5. A mobile robot comprising:

a first sensor configured to extract a location of the mobile robot, the first sensor being a location sensor;

a second sensor configured to capture an image of a street sign, the second sensor being a camera;

a memory configured to store instructions and a first trained artificial neural network model; and a controller including at least one processor, the processor configured to:

receive the location of the mobile robot from the first sensor;

extract a driving map corresponding to an area within a predetermined distance from the location of the mobile robot and store the driving map in the memory;

receive a first image of a first street sign from the second sensor;

provide the first image to the first trained artificial neural network model to determine whether the first street sign corresponds to a starting point of an illegal parking area;

receive a second image of a second street sign from the second sensor;

provide the second image to the first trained artificial neural network model to determine whether the second street sign corresponds to an end point of the illegal parking area;

set the illegal parking area in the extracted driving map and store the illegal parking area in the memory, the illegal parking area being set as a road between locations of the first street sign and the second street sign;

control the mobile robot to move in the extracted driving map including the illegal parking area;

capture a first license plate of a vehicle located within the illegal parking area at a first time by controlling the second sensor;

capture a second license plate of a vehicle located within the illegal parking area at a second time after the first time by controlling the second sensor;

determine that license plate numbers of the first license plate and the second license plate are the same; and in response to determining that the license plate numbers are the same, transmit an illegal parking report using the license plate numbers.

6. The mobile robot of claim 5, wherein the processor is further configured to:

recognize whether the vehicle is included in the illegal parking area by a predetermined threshold value or more; and determine that the vehicle is illegally parked in a case where the vehicle is included by the predetermined threshold value or more.

7. The mobile robot of claim 5, wherein the memory further comprises a second trained artificial neural network model, and wherein the processor is configured to recognize the license plate numbers by providing images associated with the first license plate and the second license plate to the second trained artificial neural network model.

8. The mobile robot of claim 5, wherein the controller is further configured to transmit an illegal parking warning broadcast between the first time and the second time.

* * * * *